United States Patent [19]

Goretta et al.

[11] 4,331,792

[45] May 25, 1982

[54] CONTINUOUS PROCESS FOR PRODUCTION OF COPOLYMER OF AN ALKALI METAL VINYL SULFONATE AND ACRYLIC ACID

[75] Inventors: Louis A. Goretta, Naperville; Robert R. Otremba, Chicago, both of Ill.

[73] Assignee: Nalco Chemical Company, Oak Brook, Ill.

[21] Appl. No.: 153,491

[22] Filed: May 27, 1980

[51] Int. Cl.$^3$ .............................................. C08F 220/06
[52] U.S. Cl. ...................................... 526/229; 526/74; 526/240
[58] Field of Search ........................ 526/229, 240, 287

[56] References Cited

U.S. PATENT DOCUMENTS 3,755,236  8/1973  Puskas ................................. 526/287
4,076,928  2/1978  Gross .................................. 526/287
4,164,489  8/1979  Daniels et al. ...................... 526/65

*Primary Examiner*—Harry Wong, Jr.
*Attorney, Agent, or Firm*—Roylance, Abrams, Berdo & Farley

[57] ABSTRACT

There is provided a continuous process for the production of a copolymer of an alkali metal vinyl sulfonate and acrylic acid. The process comprises continuously feeding an aqueous solution of an alkali metal vinyl sulfonate and acrylic acid together with a polymerization initiator to a reaction zone. The reaction zone is operated adiabatically at a temperature sufficiently high to affect copolymerization of the alkali metal vinyl sulfonate and acrylic acid. The alkali metal vinyl sulfonate and acrylic acid are maintained in the reaction zone for a residence time sufficient to form a copolymer of these two monomers. The resultant copolymer is continuously removed from the reaction zone.

12 Claims, No Drawings

CONTINUOUS PROCESS FOR PRODUCTION OF COPOLYMER OF AN ALKALI METAL VINYL SULFONATE AND ACRYLIC ACID

BACKGROUND OF THE INVENTION

1. Field of the Invention

This invention relates to a continuous process for the production of a copolymer of an alkali metal vinyl sulfonate, such as sodium vinyl sulfonate, and acrylic acid.

2. Description of the Prior Art

Copolymers of alkali metal vinyl sulfonates, and in particular, sodium vinyl sulfonate, also known as sodium ethylenesulfonate, and acrylic acid are known in the art. Thus, the preparation of a copolymer of sodium vinyl sulfonate and acrylic acid is described by Breslow and Kutner in J. Polymer Science XXVII, 295-312 (1958). The copolymer described therein is obtained in a batch polymerization process in an aqueous medium.

U.S. Pat. No. 3,203,938 to Baechtold discloses a batch polymerization process for the preparation of a copolymer of sodium vinyl sulfonate and acrylic acid or acrylamide in an alcoholic medium in which the copolymer is insoluble. This patent teaches that a high conversion of monomers to polymer is achieved and that the relative mole ratio between the sodium vinyl sulfonate and the acrylamide or acrylic acid in the final composition may be controlled over a wide range.

The use of a batch process for the preparation of a copolymer of sodium vinyl sulfonate and acrylic acid has certain inherent disadvantages. Thus, in such a process, the sodium vinyl sulfonate has an unsatisfactory reactivity ratio with respect to acrylic acid, and the addition of acrylic acid to the sodium vinyl sulfonate must be protracted over an hour in order to attain maximum sodium vinyl sulfonate incorporation. Further, a batch polymerization process requires large and costly equipment which is difficult to move from one place to another.

SUMMARY OF THE INVENTION

It has now been discovered that the disadvantages which attend the batch polymerization of an alkali metal vinyl sulfonate such as sodium vinyl sulfonate and acrylic acid may be overcome by the continuous polymerization of such monomers. Thus, according to the present invention, there is provided a continuous process for the production of a copolymer of an alkali metal vinyl sulfonate and acrylic acid. The process comprises continuously feeding an aqueous solution of an alkali metal vinyl sulfonate and acrylic acid together with a polymerization initiator to a reaction zone. The reaction zone is maintained at a temperature sufficiently high to effect copolymerization of the alkali metal vinyl sulfonate and acrylic acid. The alkali metal vinyl sulfonate and acrylic acid are maintained in the reaction zone for a residence time sufficient to form a copolymer of these two monomers. The resultant copolymer is continuously removed from the reaction zone.

DESCRIPTION OF THE PREFERRED EMBODIMENTS

The alkali metal vinyl sulfonates employed in the practice of this invention may be sodium vinyl sulfonate, potassium vinyl sulfonate, ammonium vinyl sulfonate or lithium vinyl sulfonate, sodium vinyl sulfonate being preferred. The alkali metal sulfonate and the acrylic acid may be passed to the reaction zone as separate solutions, although it is preferred to feed them together as a single solution from a reservoir. The amounts of alkali metal vinyl sulfonate and acrylic acid may be varied widely. Preferably from about 0.01 to 0.5 moles of alkali metal sulfonate per mole of acrylic acid is employed. A more preferred range is 0.05-0.25 to one.

The natural pH of a solution of sodium vinyl sulfonate and acrylic acid is about 2.5. It is known that pH effects reactivity ratios. Accordingly, in a preferred embodiment of this invention, the pH of the solution of sodium vinyl sulfonate and acrylic acid is adjusted to from about 4.0 to 5.5. This pH adjustment may be accomplished by the addition of a base such as sodium hydroxide. At this acidity, about 50 to 80% of the acrylic acid is neutralized over this range and improved sodium vinyl sulfonate incorporation is attained.

The polymerization initiator useful in the practice of this invention may be any catalyst capable of liberating free radicals under the reaction conditions employed. Examples include hydrogen peroxide, persulfates, and organic oxidizing substances. It is preferred to use a redox system consisting of an inorganic or organic oxidizing substance in combination with an inorganic reducing substance such as sulfite, metabisulfite, bisulfite, etc. An especially preferred redox system comprises ammonium persulfate and sodium bisulfite fed to the reaction zone from separate reservoirs containing aqueous solutions of these materials.

The reservoirs in which the solutions of alkali metal vinyl sulfonate, acrylic acid and catalyst are stored are provided with pumps and appropriate metering means so that a continuous and constant supply of each solution may be passed continuously to the reaction zone. The reaction zone may comprise a continuous tube reactor with connecting pipes through which the solutions of monomers and polymerization initiator, and the resultant polymer solution are forced to flow. The residence time of the monomer solution in the reaction zone is preferably from about 3 to 10 minutes and the reactor is preferably operated at a temperature of from about 120° to 350° F. Most preferably, residence times are 5 to 7 minutes and the reactor is operated at a temperature of from about 140° to 220° F. Temperatures are maintained adiabatically.

The copolymers prepared in accordance with the process of the present invention are water soluble polymers that are insoluble in alcohol. In order to recover the copolymer of alkali metal vinyl sulfonate and acrylic acid from the aqueous solution in which it was prepared, it may be precipitated by the addition of an alcohol such as methanol. However, these polymers may also be isolated by the use of spray or drum drying.

The copolymers prepared by the process of this invention are useful as water conditioning agents, e.g., to prevent calcium and magnesium phosphate from depositing on the wall of a boiler, and in other areas where such copolymers are of known utility.

The practice of this invention permits the continuous polymerization of a mixture of an alkali metal vinyl sulfonate and acrylic acid without the necessity for prolonging the addition of the alkali metal sulfonate to the acrylic acid over an hour in order to attain maximum sodium vinyl sulfonate incorporation as is required in the batch process. Further, less expensive, smaller and more portable equipment is required in the practice of this invention as compared to polymerization of these monomers in a batch process.

The following examples illustrate the practice of this invention:

EXAMPLE 1

Into a first reservoir was placed a solution comprising 706 grams of deionized water, 1154 grams of a 25% aqueous solution of sodium vinyl sulfonate and 779 grams of acrylic acid, said solution having a pH of 2.4; into a second reservoir was placed a solution comprising 963 grams of deionized water and 37 grams of ammonium persulfate; and into a third reservoir was placed a solution comprising 889 grams of deionized water and 111 grams of sodium metabisulfite. The contents of the first reservoir, heated to a temperature of 166° F., was pumped through a heat exchanger at a constant rate of 20 cc. per minute to a continuous tube reactor wherein it was mixed with flows from the second and third reservoirs, each pumped at a constant rate of 5 cc. per minute to the continuous tube reactor. The catalyst streams from the second and third reservoirs were at room temperature. Therefore, when these streams are mixed with the feed stream from the first reservoir, some drop in temperature occurred. The total of the three streams was mixed before introduction into the reactor bottom. The reactor was a vertical tube, 40 inches long and one inch in diameter. It was made from schedule 40-316ss pipe. The process was conducted at a temperature range within the reactor of 140° F. to 220° F. and a residence time of the sodium vinyl sulfonate and acrylic acid in the reactor of 5 minutes. After passing through the reactor, the total product was withdrawn from the top of the tube, passed through a second heat exchanger and cooled. The cooled solution was then discharged to atmospheric pressure through a back-pressure regulator. The resultant copolymer which was recovered showed by colloid titration 40% incorporation of sodium vinyl sulfonate and 100% incorporation of acrylic acid. The copolymer had an intrinsic viscosity of 0.142.

EXAMPLE 2

The process of Example 1 was repeated except that the pH of the sodium vinyl sulfonate and acrylic acid solution was adjusted to 4.45. Colloid titration of the recovered copolymer showed 82% incorporation of sodium vinyl sulfonate.

EXAMPLE 3

The process of Example 1 was repeated except that the pH of the sodium vinyl sulfonate and acrylic acid solution was adjusted to 4.8 and the amount of sodium meta bisulfite in the third reservoir was reduced from 111 to 37 grams. Colloid titration of the recovered copolymer showed 80% incorporation of the sodium vinyl sulfonate.

Although the invention has been described in detail with particular reference to certain preferred embodiments thereof, variations and modifications can be affected within the spirit and scope of the invention as described hereinbefore, and as defined in the appended claims.

We claim:

1. A continuous process for the production of a copolymer of an alkali metal vinyl sulfonate and acrylic acid which comprises continuously feeding an aqueous solution of an alkali metal vinyl sulfonate and acrylic acid together with a polymerization initiator to a reaction zone and copolymerizing said alkali metal vinyl sulfonate and acrylic acid, said reaction zone being maintained at a temperature sufficiently high to effect copolymerization of said alkali metal vinyl sulfonate and acrylic acid, the residence time of said alkali metal vinyl sulfonate and acrylic acid in said reaction zone being sufficient to form a copolymer thereof and being from about three to ten minutes, and continuously recovering said copolymer from said reaction zone.

2. A process as defined in claim 1 wherein said alkali metal vinyl sulfonate is sodium vinyl sulfonate.

3. A process as defined in claim 2 wherein said sodium vinyl sulfonate and acrylic acid are mixed together with water before being fed to said reaction zone.

4. A process as defined in claim 3 wherein the pH of said solution of sodium vinyl sulfonate and acrylic acid is adjusted to within the range of from about 4.0 to 5.5 before being fed to said reaction zone.

5. A process as defined in claim 3 wherein said polymerization initiator is a redox catalyst.

6. A process as defined in claim 5 wherein said redox catalyst comprises ammonium persulfate and sodium bisulfite.

7. A process as defined in claim 6 wherein an aqueous solution of said ammonium persulfate and an aqueous solution of said sodium bisulfite are separately fed to said reaction zone.

8. A process as defined in claim 3 wherein said reaction zone is operated adiabatically at a temperature of from about 120° to 250° F. during said process.

9. A process as defined in claim 3 wherein said reaction zone is operated adiabatically at a temperature of from about 140° to 220° F. during said process.

10. A process as defined in claim 3 wherein the residence time of said sodium vinyl sulfonate and acrylic acid in said reaction zone is from about 5 to 7 minutes.

11. A process as defined in claim 3 wherein from about 0.01 to 0.5 mole of sodium vinyl sulfonate per mole of acrylic acid is employed.

12. A process as defined in claim 3 wherein from about 0.05 to 0.25 mole of sodium vinyl sulfonate per mole of acrylic acid is employed.

* * * * *